United States Patent
Cho et al.

(10) Patent No.: US 7,107,208 B2
(45) Date of Patent: Sep. 12, 2006

(54) DUAL MODE RADIO MOBILE TERMINAL IN WHICH AN ANALOG OR DIGITAL MODE IS DETERMINED BY REQUEST OF A VOICE FUNCTION

(75) Inventors: Hee-Sun Cho, Yongin-shi (KR); Kyung-Ha Lee, Seoul (KR); Sung-Bok Park, Kyonggi-do (KR)

(73) Assignee: Samsung Electronics Co., Ltd., (KR)

( * ) Notice: Subject to any disclaimer, the term of this patent is extended or adjusted under 35 U.S.C. 154(b) by 297 days.

(21) Appl. No.: 09/871,561

(22) Filed: May 31, 2001

(65) Prior Publication Data

US 2001/0051869 A1    Dec. 13, 2001

(30) Foreign Application Priority Data

Jun. 9, 2000    (KR) ............................... 2000-31817

(51) Int. Cl.
*G10L 19/00*    (2006.01)
*G04M 1/00*    (2006.01)

(52) U.S. Cl. .................. 704/212; 704/221; 455/550.1; 455/552.1; 455/432.1; 455/419; 455/553.1

(58) Field of Classification Search ............... 704/212, 704/221, 500, 500.1; 455/553.1, 419, 552.1, 455/550.1, 432.1; 370/465, 398
See application file for complete search history.

(56) References Cited

U.S. PATENT DOCUMENTS

| | | | | |
|---|---|---|---|---|
| 5,422,932 A | * | 6/1995 | Kay et al. ................ | 455/452.1 |
| 5,550,893 A | * | 8/1996 | Heidari .................... | 455/553.1 |
| 5,729,536 A | * | 3/1998 | Doshi et al. ................ | 370/398 |
| 5,781,540 A | * | 7/1998 | Malcolm et al. ............ | 370/321 |
| 5,790,957 A | * | 8/1998 | Heidari .................... | 455/553.1 |
| 5,903,862 A | * | 5/1999 | Weaver et al. .............. | 704/221 |
| 5,956,673 A | * | 9/1999 | Weaver et al. .............. | 704/212 |
| 6,070,089 A | * | 5/2000 | Brophy et al. .............. | 704/221 |
| 6,134,242 A | * | 10/2000 | Aftelak ...................... | 704/212 |
| 6,363,339 B1 | * | 3/2002 | Rabipour et al. ........... | 704/201 |
| 6,421,353 B1 | * | 7/2002 | Kim .......................... | 370/465 |
| 6,438,358 B1 | * | 8/2002 | Higuchi ..................... | 455/84 |
| 6,622,017 B1 | * | 9/2003 | Hoffman .................... | 455/419 |
| 6,625,451 B1 | * | 9/2003 | La Medica et al. ......... | 455/434 |

FOREIGN PATENT DOCUMENTS

| | | | |
|---|---|---|---|
| JP | 10-243453 | * | 9/1998 |
| JP | 11-178065 | * | 7/1999 |

* cited by examiner

*Primary Examiner*—Vijay Chawan
(74) *Attorney, Agent, or Firm*—Dilworth & Barrese LLP

(57) ABSTRACT

A method for operating a voice function of a dual-mode mobile communication apparatus including a speaker's voice recognition function and a voice output function of stored information while the mobile communication apparatus is operating in an analog mode is disclosed. The method comprises the step of determining whether a voice function request signal is input or not, switching a vocoder into a digital mode for operating the voice function, and operating the voice function in digital mode.

6 Claims, 6 Drawing Sheets

DUAL MODE RADIO MOBILE TERMINAL IN WHICH AN ANALOG OR DIGITAL MODE IS DETERMINED BY REQUEST OF A VOICE FUNCTION

PRIORITY

This application claims priority to an application entitled "DUAL MODE RADIO MOBILE TERMINAL POSSIBLE SPEECH FUNCTION IN ANALOG MODE" filed with Korea Industrial Property Office dated Jun. 9, 2000, and assigned Patent Application Serial No. 2000-31817, the contents of which are hereby incorporated by reference.

1. Field of the Invention

The present invention relates generally to voice registration and recognition of a speaker's voice and the output of a voice signal stored in memory in connection with a dual-mode radio mobile terminal that utilizes both an analog mode and a digital mode. More particularly, the present invention relates to a method of operating a voice function, such as a speaker's voice registration and recognition and a voice output of stored information, whether the dual-mode radio mobile terminal is operating in analog mode or a digital mode.

2. Description of the Related Art

Generally, there are either speaker dependent circuits or speaker independent circuits in speech recognition technology. The speaker independent circuit can recognize speech from any speaker without the need to train the circuitry to recognize the voices. However, speaker dependent technology requires the speech recognition circuit to be trained on a speaker's voice before the speaker's voice can be recognized. That is, the speaker dependent circuitry requires a user to previously store his/her voice in memory, and then compare input voice data inputted through a mic with stored voice data.

In mobile terminals having a speech recognition function that utilizes speaker independent technology, how to store user's voice signal in memory of the mobile terminal is determined by what communication method the mobile terminal utilizes. Namely, in an analog communication system, such as Advanced Mobile Phone System (AMPS), a user's voice is stored in memory after being transformed into digital data in PCM (pulse code modulation) format by a CODEC. However, in a digital communication system, such as Code Division Multiple Access (CDMA), a users s voice signal is in a digital format as packet data that is stored in memory. Thus, in a dual-mode mobile terminal that utilizes both analog communication and digital communication systems, the dual-mode mobile terminal must store two kinds of voice data, respectively, in memory to properly operate a voice function, such as voice dialing, voice memo, and the output of a voice guidance message. Otherwise, the voice function of the mobile terminal that stores only one format of voice data could not be used if the mobile terminal is operating in a different communication mode. Therefore, suppliers of mobile terminals have been trying to develop a dual-mode mobile terminal that not only stores a user's voice data in packet format, but also operates the voice function in an analog mode.

FIG. 1 illustrates a block diagram of mobile terminal to which the present invention is applied.

Referring to FIG. 1, with pushing or touching a specific button or combination of several buttons on a keypad 106, a user of a mobile terminal may utilize voice functions, such as voice dialing or voice memo. The registration of a voice signal, such as a voice memo, is performed through several steps. That is, if a user of mobile terminal speaks through a mic 111, the speaker's voice signal inputted through the mic 111 is amplified in an audio amplifier 109, and then provided to a CODEC 108. The CODEC 108 samples the inputted voice signal, and then transforms the signal into digital data in PCM (Pulse Code Modulation) format. The digital data in PCM format transformed from the voice signal is provided to a VOCODER 107. The VOCODER 107 extracts the characteristics of the voice signal to reduce the size of data, and changes the reduced data into digital packet data. The digital packet data is stored in a specific area of a memory 104 under the control of the processor 103.

The speech recognition procedures, such as voice dialing, are similar to the voice registration procedures, but includes several different steps. The processor 103 compares digital voice packet data generated by the VOCODER 107 with voice packet data stored in memory 104 to detect the same voice data, and if the same voice data is stored, the voice function corresponding to the voice data operates. For example, if a user speaks "company", the processor 103 detects whether there is voice data corresponding to "company" in memory. If voice data corresponding to "company" exists in memory, the processor 103 dials a phone number matching the voice data "company". However, in prior art radio mobile terminals that utilize, for example, Qualcomm's MSM chip, in a base station that is in analog communication mode, the processor 103 instructs the VOCODER 107 to change from packet mode to PCM mode. Therefore, if the user inputs his voice through the mic 111 to operate the voice function, the inputted voice signal is amplified by the audio amplifier 109, and transformed into PCM format data by CODEC 108. The transformed data is provided to the VOCODER 107, which maintains the data in PCM format. However, the processor 103 cannot compare the inputted voice data with the voice data stored in memory 104 because the voice data stored in memory 104 is maintained in packet format. As a result, the voice function cannot be operated. In case of the voice guidance message, the user cannot listen to the message either, since the VOCODER 107 is in PCM format and the voice guidance message is stored in packet format.

SUMMARY OF THE INVENTION

It is therefore an object of the present invention to provide a method for operating a voice registration and recognition and output function of a voice signal in a mobile communication apparatus operating in analog mode, wherein the mobile communication apparatus is a dual-mode device that is capable of communication in both digital and analog mode.

It is another object of the present invention to provide a method for outputting a voice signal that is stored in packet format in memory while the dual-mode mobile communication apparatus is operating in analog mode.

It is still another object of the present invention to provide a method for switching a vocoder in the dual-mode mobile communication apparatus into a packet mode to operate a voice function including a speaker's voice registration, and recognition, and voice output of stored information while the dual-mode mobile communication apparatus is operating in an analog mode.

It is still further another object of the present invention to provide a method for switching the vocoder in the dual-mode mobile communication apparatus into a PCM mode if a call request signal is generated while the dual-mode mobile communication apparatus is operating the voice function corresponding to a speaker's voice registration and recognition and voice output of stored information.

According to an aspect of the present invention, there is provided a method for operating a voice function of a dual-mode mobile communication apparatus including a speaker's voice registration and recognition function and a voice output function of stored information while the mobile communication apparatus is operating in an analog mode, comprising the steps of:

determining whether a voice function request signal is input or not; switching a vocoder into a digital mode for operating the voice function; and operating the voice function in digital mode.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

A preferred embodiment of the present invention will be described in detail hereinbelow with reference to the accompanying drawings. In the following description, numerous specific details are set forth to provide a more thorough understanding of the present invention. It will be apparent, however, to one skilled in the art that the present invention may be practiced without these specific details. In other instances, well known functions or constructions have not been described so as not to obscure the present invention.

FIGS. 2A–2D illustrate a preferred embodiment of a methods for operating a voice function in a dual-mode mobile terminal, including speaker's voice registration and recognition function and a voice output function of stored information when the mobile terminal is operating in analog mode, wherein the mobile terminal utilizes both a digital communication mode and an analog communication mode.

Figure 1:
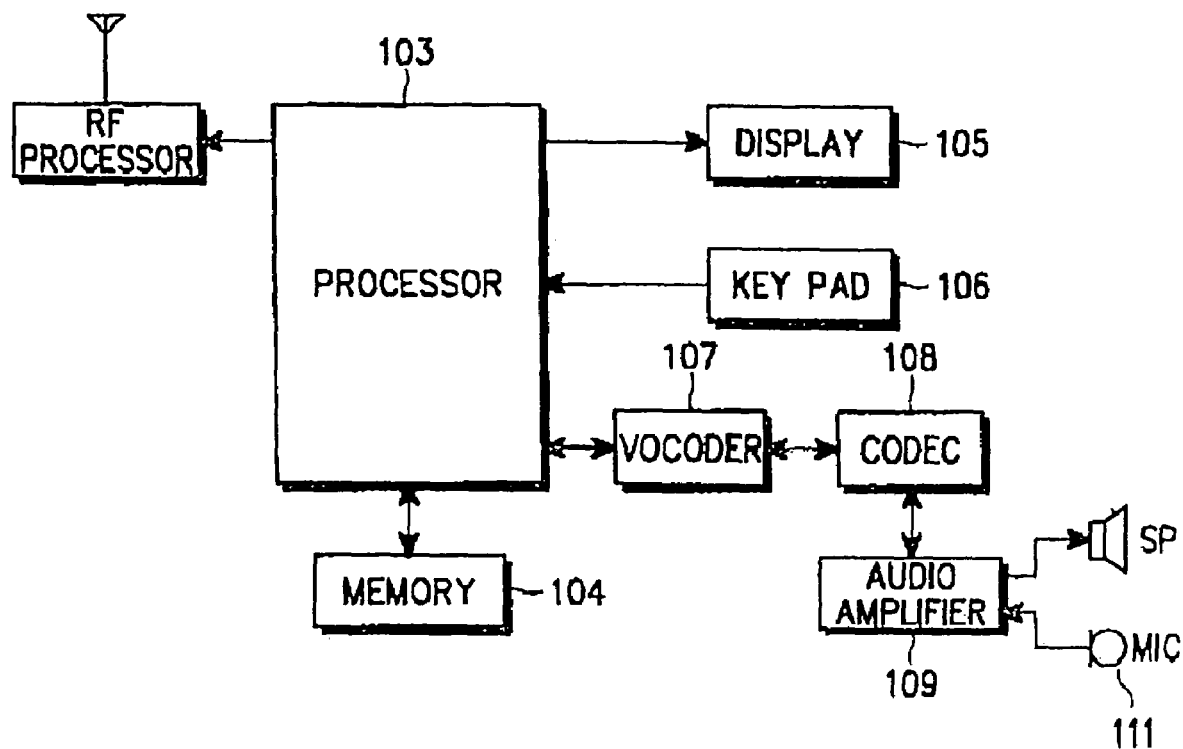
FIG. 1 is a block diagram showing the structure of a dual-mode mobile communication apparatus.
Figure 2A:
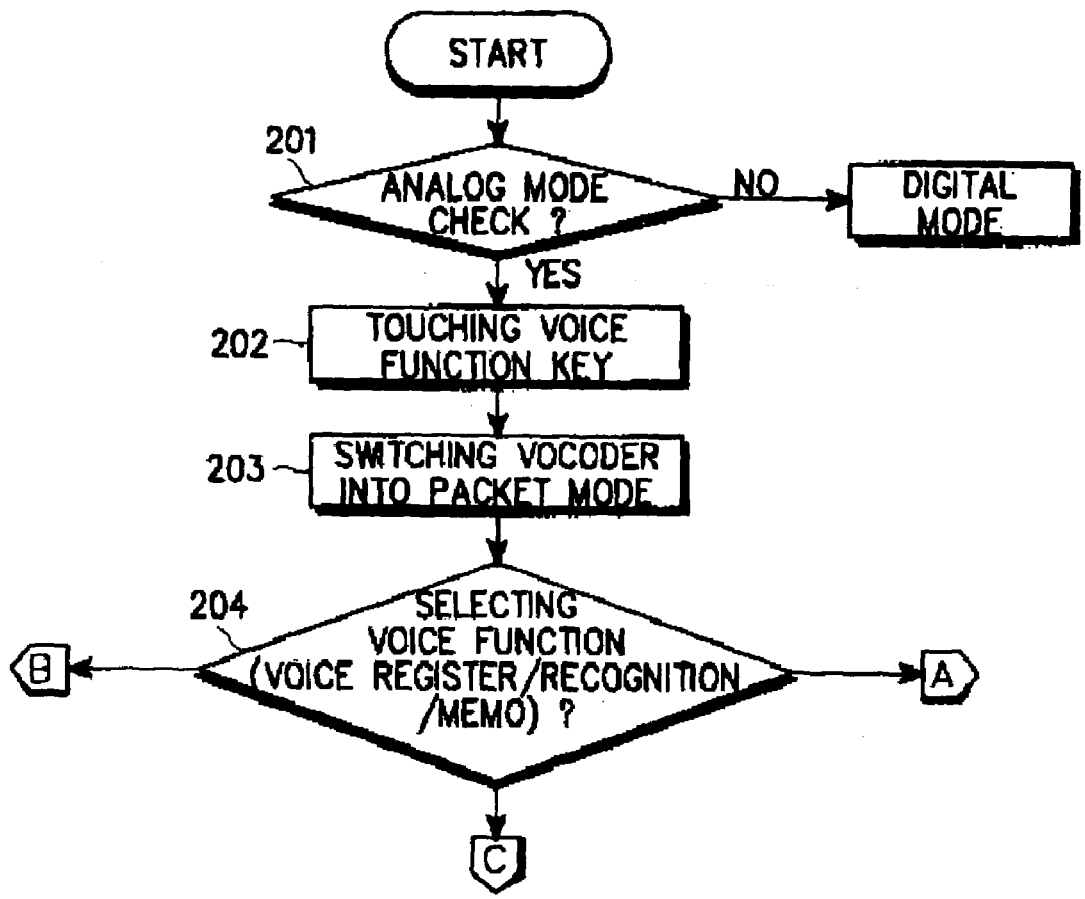
FIGS. 2A–2D is a flow chart which illustrates the operation of the voice function while the dual-mode mobile communication apparatus is operating in an analog mode.
Figure 2B:
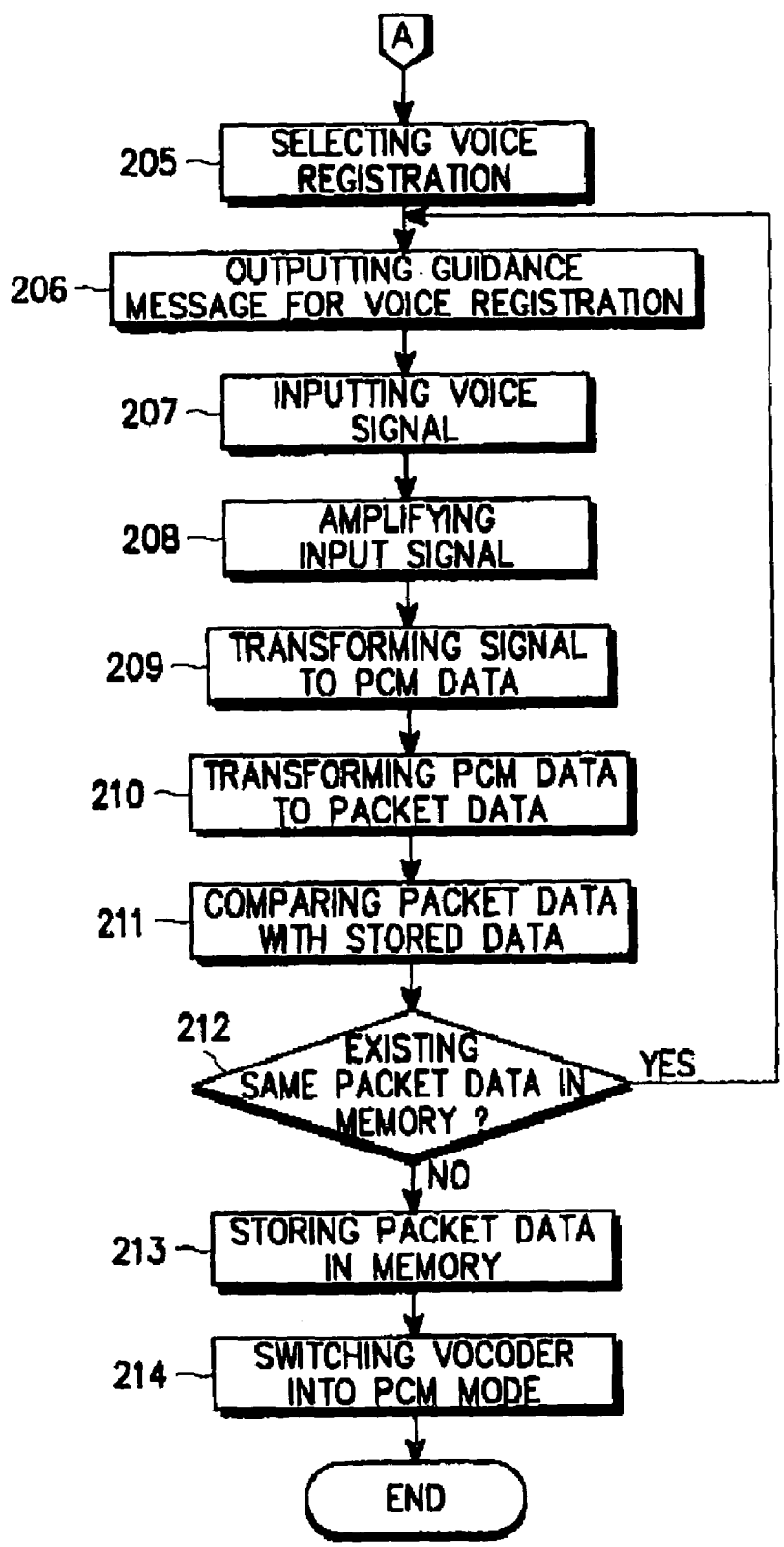

Referring to FIG. 2A, the mobile terminal checks whether a base station associated with the mobile terminal utilizes an analog communication mode, such as AMPS, when its power is turned on or upon handover, in step 201. If the base station utilizes the analog method, the processor 103 of the mobile terminal instructs its vocoder to change over to PCM mode. However, if the base station utilizes the digital method, the processor 103 of mobile terminal does not need to instruct the vocoder to change over to PCM mode in order to operate a voice function. When the vocoder of the mobile terminal is in PCM mode, a user of the mobile terminal touches a button or key to input key signal corresponding to voice function in order to operate the voice function in step 202. If the user pushes the button corresponding to the voice function, the processor 103 instructs the vocoder to change from PCM mode to packet mode in step 203. The processor outputs a message in voice or displays the message on the LCD 105 in order for the user of the mobile terminal to select what voice function the user wants in step 204.

The speaker dependent voice functions are usually categorized as voice registration, voice memo registration and playing and speech recognition. The processes associated with these categories with respect to the choice made by the user in step 204 will now be explained. First, the function of voice registration selected by the user will be explained with respect to FIG. 2B. The user selects the voice registration function in step 205, and the processor 103 of the mobile terminal outputs messages for voice registration in step 206. According to the messages output for voice registration, the user inputs his voice through mic 111 in step 207, and the inputted voice signal is amplified by audio amplifier 109 in step 208. The amplified voice signal is transformed into digital data in a PCM format by CODEC 108 in step 209. The voice data transformed to PCM format is then transformed to digital packet data by VOCODER 107 in step 210. The processor 103 compares data that is transformed into packet format in the step 210, with data stored in a specific area of memory 104, which is in packet format voice data in steps 211 and 212. If there is no match with stored voice data, the voice data is stored in a specific area of the memory in step 213. As the function of voice registration is completed, the processor 103 instructs the vocoder 107 to change back to PCM mode in step 214. However, if there is a match with stored data in memory 104 in step 212, the voice registration process returns to the step 206.

Figure 2C:
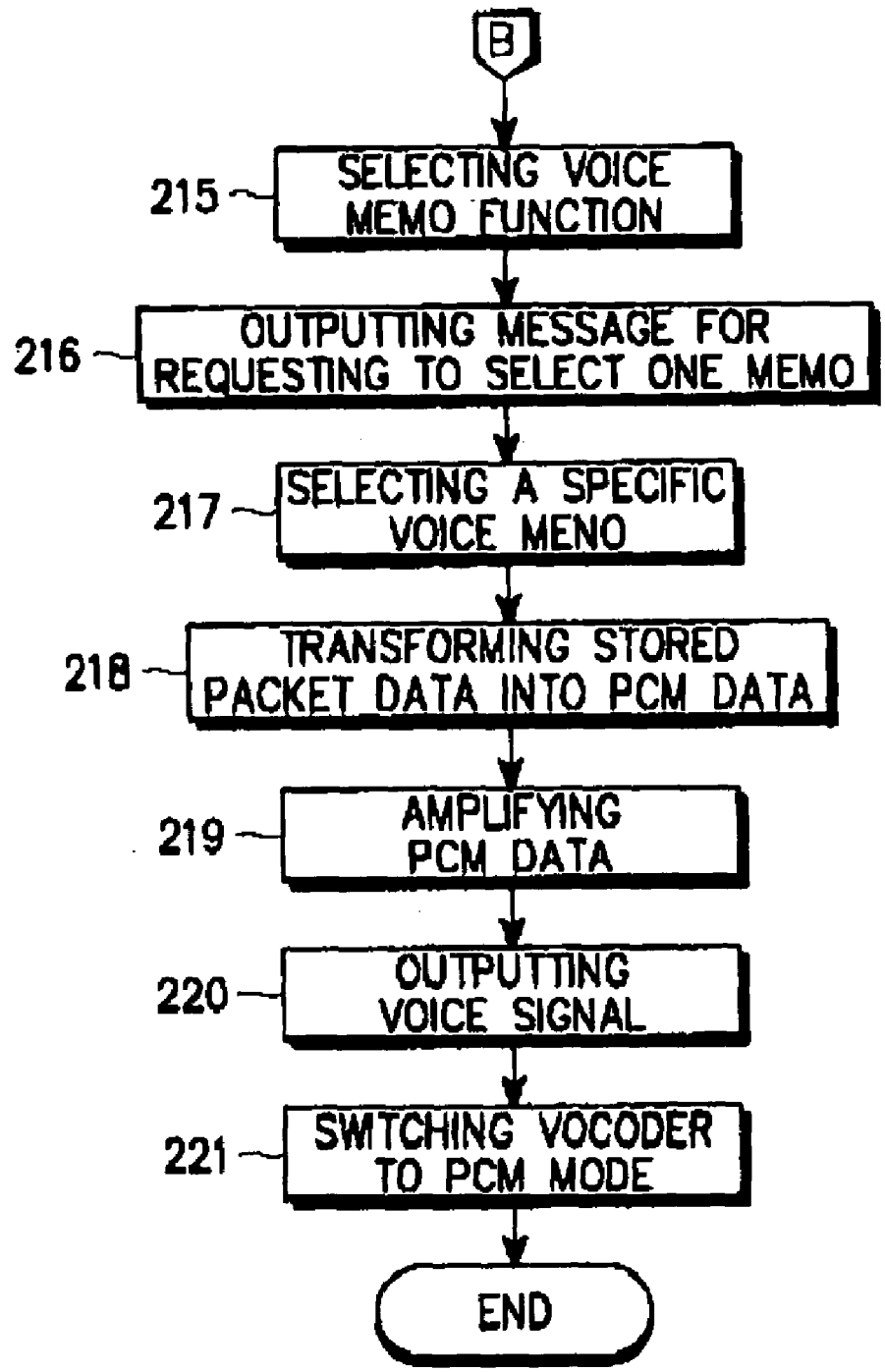

Second, the process will be explained for when a user of the mobile terminal selects the voice memo playing function with respect to FIG. 2C. The user selects the voice memo playing function by pushing a button or key on the keypad in step 215. If the voice memo playing function is selected, the processor 103 outputs message to have the user select what he wants to listen to in step 216. Through the message output in the step 216, the user selects a voice memo that the user wants in step 217. The processor 103 instructs the vocoder 107 to change the voice memo, which is stored in packet format in memory 104, to data in PCM format in step 218. The voice memo transformed to PCM format in the above step is amplified in the audio amp 109 and output in steps 219 and 220, respectively. Upon completion of the output of the voice memo, the processor 103 instructs the vocoder 107 to change back to PCM mode in step 221.

Figure 2D:
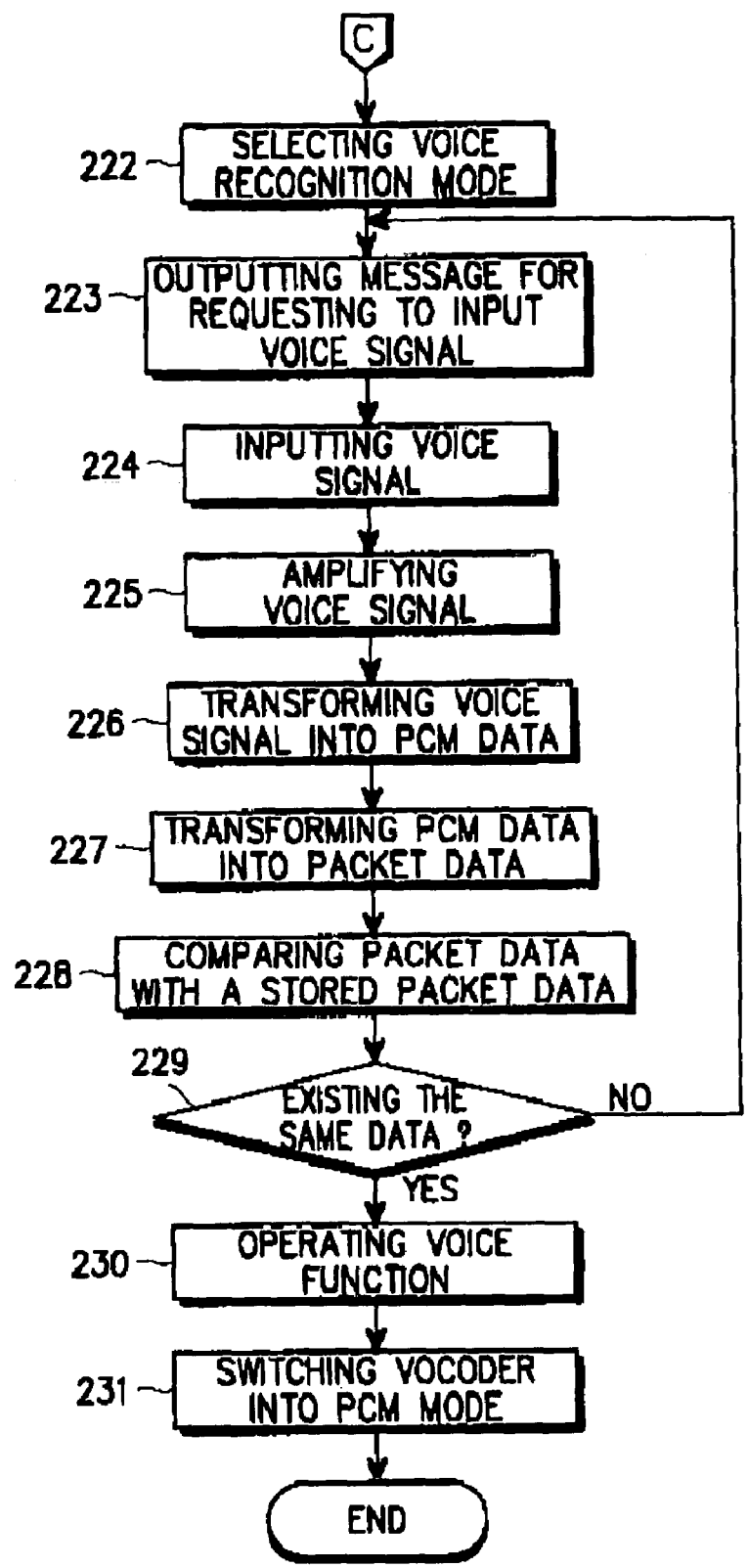

Finally, the process will be explained if the user of the mobile terminal selects the speech recognition function with respect to FIG. 2D. The user selects speech recognition function in step 222. The processor 103 outputs an information message to request the input of voice in step 223. Following the information message in step 223, the user input his voice through mic 111 in step 224, and the inputted voice is amplified in audio amplifier 109 in step 225. The amplified voice signal in step 225 is transformed into digital data in PCM format by CODEC 108 in step 226, and the digital data in PCM format is transformed into digital packet data in VOCODER 107 in step 227. The processor 103 compares the voice data transformed into packet format with voice packet data stored in memory 104, and checks whether there is a match in steps 228 and 229, respectively. If there is a match in step 229, the processor 103 operates the speech recognition function, for example voice dialing in step 230. Upon completion of step 230, the processor 103 instructs the VOCODER 107 to change back to PCM mode in step 231. If there is a no match with the voice data inputted in step 229, the process returns to the step 223.

Figure 3:
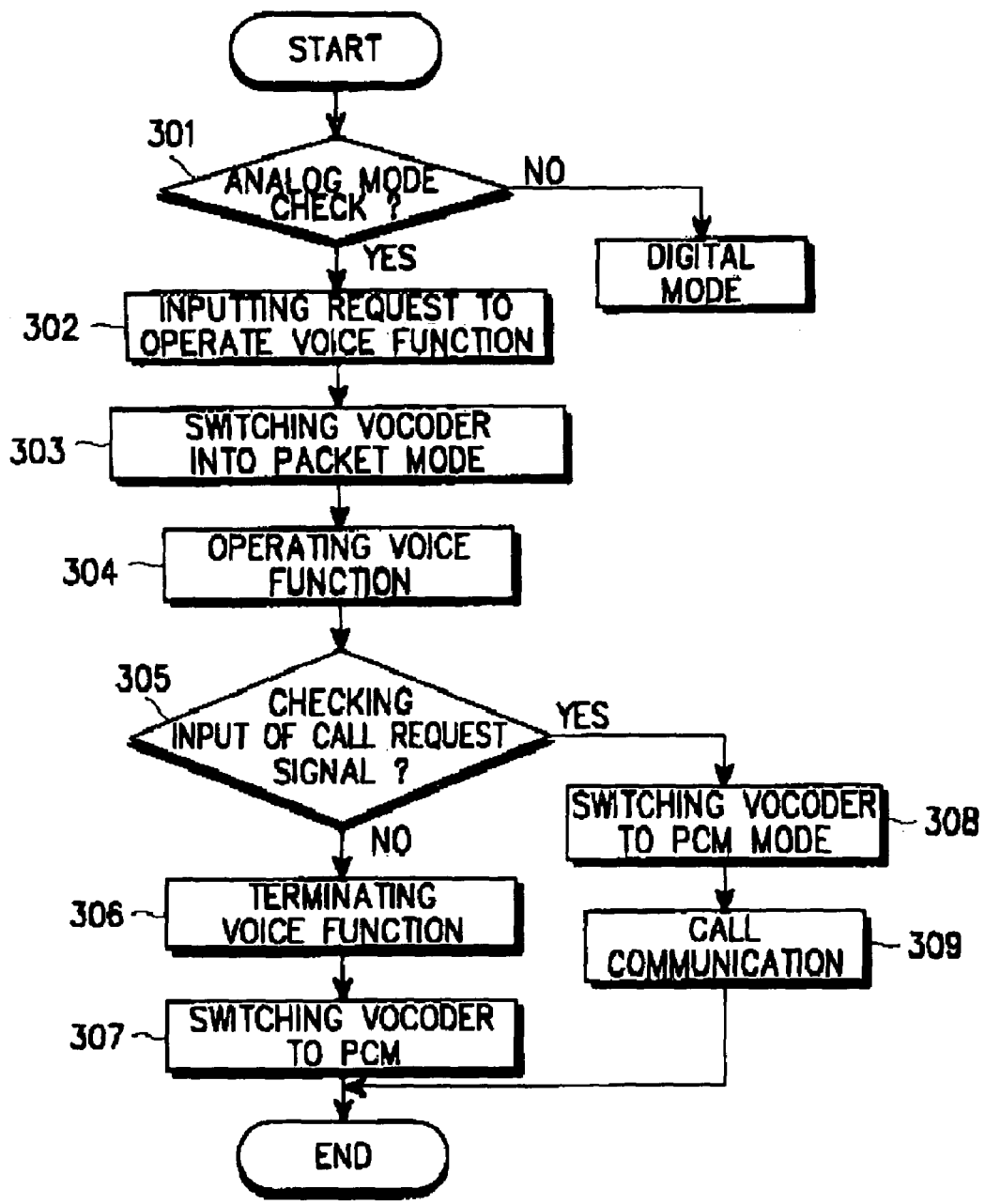
FIG. 3 is a flow chart, which illustrates the process if a call request signal is input while the dual-mode mobile communication apparatus is operating in an analog mode.

FIG. 3 illustrates the procedure of suspending the voice function if a call request signal is input while the mobile terminal is operating the voice function in an analog mode.

Referring to FIG. 3, the processor 103 routinely checks whether a call request signal is input or not during operation of the voice function in step 305. Steps 301 to 304 correspond to one of the processes among FIGS. 2B, 2C or 2D. If a call request signal is detected in step 305, the processor 103 terminates the operation of the voice function, and instructs the VOCODER 107 to change back to PCM mode in step 308 so that the user can communicate in analog mode in step 309. However, if a call request signal is not detected in step 305, the processor 103 instructs VOCODER 107 to change back to PCM mode in step 307 after completing the voice function in step 306.

Therefore, the controller of the mobile terminal instructs vocoder to change from PCM mode to packet mode while the dual mode radio mobile terminal is in analog mode and a voice function is operating.

The above description of the preferred embodiment is provided to enable any person skilled in the art to make or use the present invention. Various modifications to the embodiments will be readily apparent to those skilled in the art, and the generic principles defined herein may be applied to other embodiments. Thus, the present invention is not intended to be limited to the embodiment described herein but is to be accorded the widest scope consistent with the appended claims.

What is claimed is:

1. A method for operating a voice function including a speech recognition function and a function for outputting a voice memo in a dual-mode radio mobile terminal, the terminal including a vocoder for converting data between PCM format and packet format, comprising steps of:

determining whether a request for the voice function is input while the dual-mode radio mobile terminal is in an analog communication mode;

switching the vocoder into a digital mode to operate the voice function while the dual-mode radio mobile terminal is in the analog communication mode; and operating the voice function in the digital mode.

2. The method for operating a voice function as claimed in claim 1, wherein the vocoder is switched from PCM mode to packet mode.

3. The method for operating a voice function as claimed in claim 2, further comprising the step of switching the vocoder back to PCM mode if a call request is input during operation of the voice function in packet mode.

4. The method for operating a voice function as claimed in claim 2, further comprising the step of switching the vocoder back to PCM mode if the voice function is terminated.

5. A method for operating a voice function including speaker's speech recognition and output of stored information by voice in a mobile terminal, the mobile terminal including a vocoder for converting data between PCM format and packet format, comprising the steps of:

determining whether a request for the voice function is input while the mobile terminal is operating in an analog communication mode;

switching the vocoder from a PCM mode to a packet mode while the dual-mode radio terminal is in the analog communication mode;

operating the voice function; and switching the vocoder back to PCM mode if the voice function is terminated.

6. A method for operating a voice function including speaker's speech recognition and voice output of stored information in a mobile terminal, the mobile terminal including a vocoder for converting data between PCM format and packet format, comprising the steps of:

determining whether a request for the voice-function is input while the radio terminal is in an analog mode;

switching a vocoder from PCM mode to packet mode while the radio terminal is in the analog communication mode;

selecting one of speech recognition function and voice output function;

operating the selected function; and switching the vocoder back to PCM mode if the voice function is terminated.

* * * * *